(12) United States Patent
Roth-Fagaraseanu

(10) Patent No.: US 7,571,528 B2
(45) Date of Patent: Aug. 11, 2009

(54) METHOD FOR THE MANUFACTURE OF HIGHLY LOADABLE COMPONENTS BY PRECISION FORGING

(75) Inventor: Dan Roth-Fagaraseanu, Stahnsdorf (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 327 days.

(21) Appl. No.: 11/305,246

(22) Filed: Dec. 19, 2005

(65) Prior Publication Data

US 2006/0130553 A1 Jun. 22, 2006

(51) Int. Cl.
*B23P 17/00* (2006.01)
*B23P 25/00* (2006.01)

(52) U.S. Cl. .............. 29/407.05; 29/407.08; 29/527.5; 72/377

(58) Field of Classification Search .............. 29/889.23, 29/889.7, 889.71, 889.72, 527.5, 527.7, 407.05, 29/407.08; 72/377
See application file for complete search history.

(56) References Cited

U.S. PATENT DOCUMENTS

| | | | |
|---|---|---|---|
| 2,422,193 A | 6/1947 | Hague | |
| 2,757,446 A * | 8/1956 | Boegehold et al. | 419/26 |
| 2,987,806 A * | 6/1961 | Pekarek | 29/889.7 |
| 3,002,264 A * | 10/1961 | Hollis et al. | 29/889.7 |
| 3,845,651 A | 11/1974 | Vau | |
| 3,981,344 A * | 9/1976 | Hayes et al. | 164/516 |
| 4,101,712 A | 7/1978 | Bomford | |
| 5,173,134 A * | 12/1992 | Chakrabarti et al. | 148/671 |
| 5,299,353 A * | 4/1994 | Nazmy et al. | 29/889.7 |
| 5,636,440 A * | 6/1997 | Bichon et al. | 29/889.72 |
| 5,671,533 A | 9/1997 | Dillamore | |
| 5,759,305 A | 6/1998 | Benz | |
| 6,138,491 A * | 10/2000 | Grewal et al. | 72/420 |
| 6,233,823 B1 * | 5/2001 | Schilling | 29/889.71 |
| 7,065,872 B2 * | 6/2006 | Ganesh et al. | 29/889.2 |
| 2003/0215349 A1 | 11/2003 | Nakamura | |
| 2004/0040361 A1 | 3/2004 | Jung | |
| 2004/0111885 A1 * | 6/2004 | Irmisch et al. | 29/889.7 |

FOREIGN PATENT DOCUMENTS

| | | |
|---|---|---|
| DE | 22 60 742 | 6/1973 |
| DE | 695 22 630 T2 | 4/1996 |
| DE | 697 07 027 T2 | 8/1997 |
| DE | 198 29 937 A1 | 1/2000 |
| DE | 101 04 638 A1 | 8/2002 |
| DE | 103 08 274 A1 | 12/2003 |
| DE | 102 43 169 A1 | 3/2004 |
| EP | 0 101 097 B1 | 4/1986 |
| EP | 0 704 263 A2 | 4/1996 |
| GB | 618697 | 2/1949 |
| GB | 727688 | 4/1955 |
| JP | 02080149 A * | 3/1990 |

* cited by examiner

*Primary Examiner*—Jermie E Cozart
(74) *Attorney, Agent, or Firm*—Timothy J. Klima

(57) ABSTRACT

A method for the manufacture of highly loadable components by precision forging, e.g., of gas turbine compressor blades with different stress zones, initially provides for the production of a preform in a one-step forming operation, e.g., casting or sintering, with further deformable volume zones with a certain volume concentration in the highly loaded areas. The preform is subsequently finish-forged at a deformation rate which is limited by the respective volumes and is merely directed to the load and strength-specific recrystallization and structural requirements in the critical stress zones of the component.

13 Claims, 1 Drawing Sheet

METHOD FOR THE MANUFACTURE OF HIGHLY LOADABLE COMPONENTS BY PRECISION FORGING

This application claims priority to German Patent Application DE 10 2004 062 174.8 filed Dec. 17, 2004, the entirety of which is incorporated by reference herein.

BACKGROUND OF THE INVENTION

This invention relates to a method for the manufacture of highly loadable components by precision forging, preferably compressor or turbine blades or similar components with different stress and volume zones.

Turbine or compressor blades for aircraft engines are, as is generally known, manufactured by hot forging a blank made of usually cylindrical starting material to a near-net-shape preform in a multitude of subsequent forming operations, if applicable with intermediate deburring and surface treatment, as well as heat treatment to re-crystallization. From the preform, which in this case already comprises an airfoil, a platform and a blade root, the final form of the blade is then produced in further processing operations, for example deburring, cleaning, cold forging or surface treatment.

In Specification GB 727 688, a method for the manufacture of precision components with complex contours is described on an example of turbine blades in which a preform is initially forged from bar-type starting material in several hot-forming operations and subsequently, after deburring and cleaning, a blade with precise shape and size is subsequently produced in one cold forming operation under high pressure. In the method described in Specification U.S. Pat. No. 6,138,491, a preform is likewise initially forged from a cylindrical blank and subsequently finally shaped in a forging die. According to Specification U.S. Pat. No. 5,173,134, titanium-alloy compressor disks and blades for aircraft engines are made in that a preform is first produced by hot forging which is subsequently finish-forged by hot forming in a die.

The individual elements of the blade, viz. airfoil, platform and root, have, on the one hand, zones of considerably different volume and, on the other hand, are subject to different loads in the individual blade areas (partially) during operation in the aircraft engine. While the upper part of the airfoil has a particularly small volume and the center part of the blade, comprising the platform and the lower airfoil part as well as the upper root part, has a large volume, the remaining bottom part of the root has an approximately medium volume, as compared to the above-mentioned volume zones. This reflects the different degrees of forming required in the respective volume zones of a uniformly shaped, for example cylindrical, blank.

Also different in the individual volume zones is the load occurring during operation. While a dynamic load in the high-frequency range occurs in the upper airfoil part with its small volume and a high static load in the center blade part with its large volume, the load in the bottom part of the blade with its medium volume is rather low.

Depending on the forming forces and the volumes deformed, the forming process as well as the heat treatment and recrystallization operations performed subsequently to the forming operations furthermore result in a microstructure which satisfies the required strength properties. The number of forming operations for the final product with different volume zones forged from an evenly shaped, for example cylindrical, starting stock is actually controlled by the shape to be achieved, not by the structural formation required to obtain the necessary strength. This means, however, that the workpiece is further processed with considerable forming and intermediate processing effort to the final component geometry even if the strength properties desired and the corresponding structure required are achieved with only a few forming operations. Conversely, it is very likely that the required microstructure is not achieved in certain volume zones with only small volume change and correspondingly low forming action.

BRIEF SUMMARY OF THE INVENTION

The present invention, in a broad aspect, provides a forming method for the manufacture of precision-forged components, in particular compressor or turbine blades for aircraft engines and similar forgings with zones of different volume and stress, which yields precision components which possess at least the required strength properties in the various stress zones, while reducing the manufacturing effort in terms of processing times and costs.

It is a particular object of the present invention to provide a solution to the above problems by a method in accordance with the characteristics described below. Further advantageous embodiments of the present invention will be apparent from the description herein.

The present invention is not only applicable to the manufacture of compressor or turbine blades of gas turbines, but is also applicable for the manufacture of other turbine components, such as the disks of compressors or turbines, and generally for highly loaded components produced by near-net-shape forming. The essence of the present invention lies in the fact that forging is not performed under the aspect of shaping the component, but—as referred to recrystallization—under the aspect of the formation of a microstructure which corresponds to the strength properties required. Accordingly, forming is limited to the degree which is absolutely necessary to obtain a structure with certain strength properties determined by the deformation rate and subsequent recrystallization.

In concrete terms, a preform with a certain volume distribution or with defined volume zones with certain volume accumulation is produced in a one-step forming operation, namely a casting or sintering process. This preform is finish-forged with a minimum number of forming operations (at least one forging step) at a deformation rate corresponding to the material accumulation in the volume zones to achieve the desired strength properties in the various component stress zones on the basis of the respective structural formation determined by the deformation rate. This method, therefore, provides for efficient manufacture of highly loadable components subject to partially different in-service loads by means of a small number of forming steps and a correspondingly small number of intermediate operations (annealing, deburring, cleaning, surface treatment).

BRIEF DESCRIPTION OF THE DRAWINGS

An embodiment of the present invention showing the manufacture of a compressor blade for a gas turbine engine is more fully described in light of the accompanying drawings. In the drawings.

DETAILED DESCRIPTION OF THE INVENTION

Figure 1:
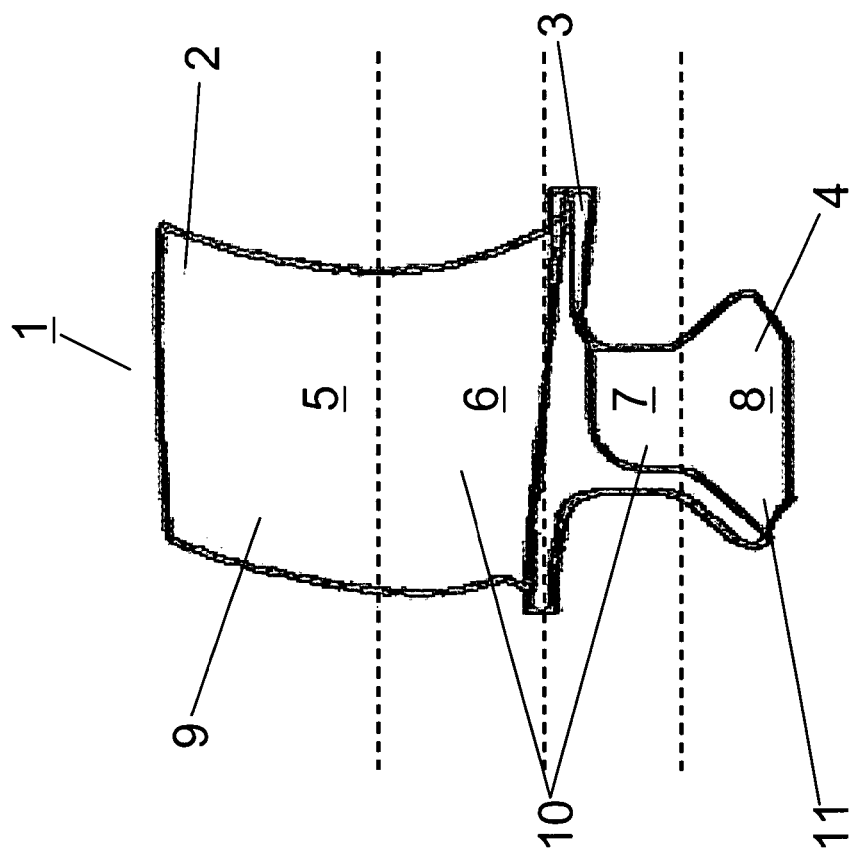
FIG. 1 shows a finished compressor blade with identification of the different volume and stress zones.

The finished compressor blade 1 shown in FIG. 1 comprises an airfoil 2, a platform 3 and a root 4. In operation, the compressor blade 1 is partially, i.e., in the various blade zones, subject to different loads. A first stress zone 5 with small volume, which covers approximately the upper airfoil half extending from the blade tip, is subject to a dynamic high-frequency load and a low static load. A second stress zone 6, which covers approximately the bottom airfoil half, has a large volume and is subject to a medium static load and a low-frequency dynamic load. A third stress zone 7, which covers the platform 3 and the adjacent upper part of the root 4, again has a large volume and is subject to a high static and a low dynamic load. A fourth stress zone 8, which covers the bottom part of the root 4, has a medium volume and is subject to low load. The compressor blade 1 accordingly comprises three volume zones 9 to 11 of which each has a different volume, namely a first volume zone 9 with small volume which corresponds to the first stress zone 5, a second volume zone 10 with large volume which corresponds to the second and third stress zones 6, 7 and a third volume zone 11 which corresponds to the fourth stress zone and whose volume, compared with the volume zones 9 and 10, is approximately medium.

Figure 2:
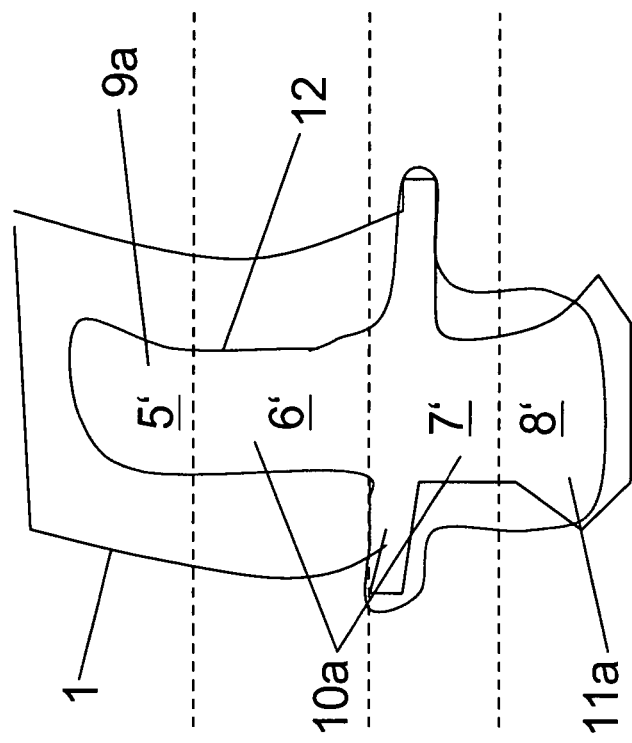
FIG. 2 shows a blade preform pre-manufactured in a sintering or casting process and finish-forged to the compressor blade shown in FIG. 1 under the aspect of the different strength requirements and volumes.

The blade preform 12 shown broken in FIG. 2 is a blank produced in a single operation by a casting process, for example centrifugal casting, or by a powder-metallurgical sintering process, in which the volumes differently distributed in accordance with the finished product are already arranged and sized such in a first to third pre-volume zone 9a, 10a and 11a that the structure required to satisfy the respective load requirements is produced in the subsequent forming process by forging using a minimum number of forming steps, for example by means of a drop forging press. On the blade preform 12, the future stress zones are indicated by the reference numerals 5' to 8'. This means that the degree of deformation is controlled by the required structure and the strength properties achievable with it, with the residual volume distribution on the blade preform being sufficient to obtain the required final shape. In other words, the volumes are distributed such in the preform that the load-required structure is formed as the respective maximally necessary final form is produced. In still other words, the degree of deformation to obtain the final form is just high enough to produce a structure which corresponds to the respective load, with the degree of deformation in the present example being larger in the second and third stress zones 6, 7 than in the first and fourth stress zones 5, 8 and larger in the first stress zone 5 than in the fourth stress zone 8. During formation and subsequent heat treatment, structure control by recrystallization is performed to a degree which corresponds to the respective deformation rate and the future operating load requirements of the blade 1.

It should be noted that the present invention is not limited to the example of a compressor blade described in the above, but generally is applicable to other components produced by precision forging, in particular turbine components, in order to reduce the time and equipment investment by reducing the number of forming and intermediate operations, such as cleaning, sand blasting, grinding, deburring or intermediate annealing, and to save precious materials based on titanium and nickel. For the manufacture of blades, it was also found that with certain materials the structure of the preform produced by casting, while being coarser, is more uniform and, therefore, less problematic for the production of the final form than the striated structure resulting from forging the preform.

LIST OF REFERENCE NUMERALS

1 Compressor blade, highly loaded component
2 Airfoil
3 Platform
4 Root
5, 5' First stress zone of 1, 12
6, 6' Second stress zone
7, 7' Third stress zone
8, 8' Fourth stress zone
9, 9a First volume zone of 1, 12
10, 10a Second volume zone
11, 11a Third volume zone
12 Blade preform, preform

What is claimed is:

1. A method for manufacturing highly loadable components with different stress zone, comprising:
   determining a deformation rate necessary to provide desired strength properties for each of a plurality of different critical stress zones of a finished component, wherein the deformation rate for each critical stress zone corresponds to a volume of a preform in the critical stress zone as compared to a volume of the finished component in that same critical stress zone, with a higher deformation rate providing increased strength properties and resulting from a higher ratio of preform volume to finished component volume within a respective critical stress zone, and wherein each of the different critical stress zones has different desired strength properties requiring a different deformation rate;
   determining a volume of the preform for each critical stress zone that will provide the necessary deformation rate;
   producing the preform in a one-step forming operation such that the preform has the determined volume in each of the critical stress zones to provide the necessary plurality of deformation rates; and
   subsequently finish forging the preform to attain, in each of the critical stress zones, the required deformation rate of the preform and the strength properties of the finished component.

2. The method of claim 1, wherein the preform is produced by a casting process.

3. The method of claim 2, wherein the preform is produced by centrifugal casting.

4. The method of claim 3, wherein the component is heat-treated upon finish-forging.

5. The method of claim 3, wherein finish-forging of the preform is performed by die forging in at least one deformation step.

6. The method of claim 2, wherein the component is heat-treated upon finish-forging.

7. The method of claim 2, wherein finish-forging of the preform is performed by die forging in at least one deformation step.

8. The method of claim 1, wherein the component is heat-treated upon finish-forging.

9. The method of claim 8, wherein finish-forging of the preform is performed by die forging in at least one deformation step.

10. The method of claim 1, wherein the preform is produced by a powder-metallurgical sintering process.

11. The method of claim 10, wherein the component is heat-treated upon finish-forging.

12. The method of claim 10, wherein finish-forging of the preform is performed by die forging in at least one deformation step.

13. The method of claim 1, wherein finish-forging of the preform is performed by die forging in at least one deformation step.

* * * * *